(12) United States Patent
Kilian

(10) Patent No.: US 10,277,282 B2
(45) Date of Patent: Apr. 30, 2019

(54) ANTENNA FOR SHORT-RANGE APPLICATIONS AND UTILIZATION OF SUCH AN ANTENNA

(71) Applicant: Dieter Kilian, Olching (DE)

(72) Inventor: Dieter Kilian, Olching (DE)

( * ) Notice: Subject to any disclaimer, the term of this patent is extended or adjusted under 35 U.S.C. 154(b) by 0 days.

(21) Appl. No.: 15/560,475

(22) PCT Filed: Feb. 5, 2016

(86) PCT No.: PCT/EP2016/000192
§ 371 (c)(1),
(2) Date: Sep. 21, 2017

(87) PCT Pub. No.: WO2016/150537
PCT Pub. Date: Sep. 29, 2016

(65) Prior Publication Data
US 2018/0115345 A1    Apr. 26, 2018

(30) Foreign Application Priority Data
Mar. 23, 2015    (DE) .......................... 10 2015 003 784

(51) Int. Cl.
*H04B 5/00*    (2006.01)
*H01Q 11/02*    (2006.01)
(Continued)

(52) U.S. Cl.
CPC .......... *H04B 5/0037* (2013.01); *H01Q 1/2225* (2013.01); *H01Q 11/02* (2013.01);
(Continued)

(58) Field of Classification Search
CPC .. H04B 5/0037; H04B 5/0025; H04B 5/0062; H04B 5/0068; H01Q 1/2225; H01Q 11/02; H01Q 13/26
(Continued)

(56) References Cited

U.S. PATENT DOCUMENTS

2006/0187123 A1    8/2006  Ando
2009/0213012 A1    8/2009  Jiang et al.
(Continued)

FOREIGN PATENT DOCUMENTS

JP    2012-129856 A    7/2012
WO    2014/041715    3/2014

OTHER PUBLICATIONS

International Search Report dated May 3, 2016, issued in connection with corresponding International Application No. PCT/EP2016/000192 (3 pages total).

*Primary Examiner* — Eugene Yun
(74) *Attorney, Agent, or Firm* — John Maldjian; Maldjian Law Group LLC

(57) ABSTRACT

An antenna for short-range applications, including an elongate two-pole conductor structure with an internal conductor and a sheath conductor coaxially surrounding the internal conductor, and a terminal structure connected to the conductor structure. The terminal structure includes an electrically insulating carrier plate, an electrically conductive sheath conductor connection surface that extends over a first region of the carrier plate on the upper side of the carrier plate and is connected to the sheath conductor, an electrically conductive internal conductor connection surface that extends over a second region of the carrier plate, which is spaced apart from the first region of the carrier plate, on the upper side of the carrier plate and is connected to the internal conductor, an electrically conductive coupling conductor surface that extends over a third region of the carrier plate on the underside of the carrier plate. The antenna provides reliable transmission of information over short distances.

16 Claims, 4 Drawing Sheets

(51) Int. Cl.
  *H01Q 13/26* (2006.01)
  *H01Q 1/22* (2006.01)
(52) U.S. Cl.
  CPC ........... *H01Q 13/26* (2013.01); *H04B 5/0025* (2013.01); *H04B 5/0062* (2013.01); *H04B 5/0068* (2013.01)
(58) Field of Classification Search
  USPC .............................................. 455/41.2, 41.1
  See application file for complete search history.

(56) References Cited

U.S. PATENT DOCUMENTS

| | | |
|---|---|---|
| 2009/0231140 A1 | 9/2009 | Hong et al. |
| 2012/0154240 A1 | 6/2012 | Shirakawa et al. |
| 2013/0050042 A1 | 2/2013 | Yoshino et al. |
| 2015/0235066 A1* | 8/2015 | Hattori ............... G06K 7/10415 340/10.1 |

* cited by examiner

US 10,277,282 B2

ANTENNA FOR SHORT-RANGE APPLICATIONS AND UTILIZATION OF SUCH AN ANTENNA

CROSS-REFERENCE TO RELATED APPLICATIONS

This application claims the benefit under 35 U.S.C. § 371 of International Application No. PCT/EP2016/000192 filed on Feb. 5, 2016, which in turn claims the benefit of German application 10 2015 003 784.6 filed on Mar. 23, 2015, the entire content of each of which is hereby incorporated by reference in its entirety.

FIELD

The present invention pertains to the field of high-frequency engineering, particularly to an antenna for short-range applications such as RFID. The invention furthermore pertains to a method for operating such an antenna and a utilization of such an antenna.

BACKGROUND

In the context of the invention, the term "short-range applications" particularly refers to applications, in which the transmission of electromagnetic energy and/or electromagnetic signals is realized over distances of less than 5 m, particularly less than 1 m, by utilizing the antenna. However, this distance is preferably greater than 0.01 m, particularly greater than 0.05 m.

The present invention is based on the objective of realizing a wireless and reliable transmission of energy and/or information, particularly over short distances, with simple means.

SUMMARY

According to a first aspect of the invention, this objective is attained with an antenna that comprises an elongate two-pole conductor structure with an internal conductor and a sheath conductor coaxially surrounding the internal conductor (e.g. a conventional "coaxial cable"), as well as a terminal structure arranged on a longitudinal end of the conductor structure, wherein the terminal structure comprises:
an electrically insulating carrier plate with an upper side and an underside,
an electrically conductive sheath conductor connection surface that extends over a first region of the carrier plate on the upper side of the carrier plate and is connected to the sheath conductor,
an electrically conductive internal conductor connection surface that extends over a second region of the carrier plate, which is spaced apart from the first region of the carrier plate, on the upper side of the carrier plate and is connected to the internal conductor,
an electrically conductive coupling conductor surface that extends over a third region of the carrier plate on the underside of the carrier plate, wherein the third region respectively overlaps at least part of the first region and the second region of the carrier plate, and
at least one throughplating that connects the internal conductor connection surface on the upper side of the carrier plate to the coupling conductor surface on the underside of the carrier plate.

In the field of high-frequency engineering, elongate two-pole conductor structures with an internal conductor and a sheath conductor coaxially surrounding the internal conductor are well known from the prior art for the transmission of high-frequency signals (e.g. in the form of a conventional "coaxial cable").

Such known coaxial conductor structures are "correctly terminated" in such a way that a termination impedance (e.g. 50Ω resistance) is connected to the sheath conductor on the one hand and to the internal conductor on the other hand on the respective longitudinal end, wherein the thusly formed conventional terminal structure lies within the region circumscribed by the sheath conductor such that the coaxial structure is not interrupted and the shielding effect of the sheath conductor ("Faraday cage") is also preserved on the terminal end. If a high-frequency (HF) signal (applied between internal conductor and sheath conductor) is input into the opposite longitudinal end of the conductor structure, an HF alternating current flows from the first end or "connecting end" to the second end or "terminal end," wherein a current with a magnitude matching that of the internal conductor current is impressed on the sheath conductor, but flows in the opposite direction. Due to the skin effect, this "return current" only has a small penetration depth in the sheath conductor and does not penetrate outward at any point due to the electrically conductive shield formed by the sheath conductor.

However, the situation is very different in the inventive termination of the coaxial conductor structure by means of a carrier plate with the above-described electrically conductive surfaces and the at least one throughplating.

Due to this design, the second end (terminal end) of the coaxial structure is interrupted (which is always avoided in coaxial lines known from the prior art). An additional return current path for the impressed return current on the inner side of the sheath conductor is realized along the outer side of the sheath conductor by "opening the sheath." The skin effect now makes it possible for both currents to flow (on the inner side and the outer side of the sheath conductor) without completely penetrating the sheath conductor. An "external current" on the sheath conductor can now be surprisingly realized in-phase with the original "signal current" in the internal conductor. It is in a way as if a signal current would be directly connected to the outer side of the sheath conductor. Since the two currents (in the internal conductor and on the outer side of the sheath conductor) are in-phase, this may also be referred to as a common-mode coupling. The inventive terminal structure advantageously makes it possible to realize an operating mode, in which the current flow on the outer side of the sheath conductor is maximized such that at least approximately matching magnitudes are ideally also achieved in addition to the phase balance. In the transmission mode of the antenna, the "HF alternating current diverted to the outer side of the sheath conductor" can propagate along the coaxial structure from the second end or terminal end back in the direction of the first end in the form of a surface wave or sheath wave and, in particular, form a relatively strong electromagnetic field that is concentrated around the sheath conductor and can be advantageously used for the wireless transmission of energy and/or information. A so-called "coupled mode" is realized if essentially no separation of electromagnetic waves from the sheath conductor takes place in this operating mode.

Vice versa, electromagnetic HF signals can also be received with the inventive antenna, wherein said signals cause surface waves on the outer side of the sheath conductor such that an antenna reception signal is available on the first end of the coaxial conductor structure. According to an embodiment with respect to the operation of the inventive antenna, is therefore proposed that a first end of the conductor structure is realized in the form of a connecting end for connecting a transmitter and/or receiver for an antenna signal to be transmitted with the antenna or an antenna signal to be received by the antenna, wherein the terminal structure is connected to a second end of the conductor structure that lies opposite of the first end.

The relatively simple inventive design advantageously makes it possible to realize, in particular, broadband coaxial traveling wave antennas for short-range applications.

In the context of the invention, the term "traveling wave" refers to the aforementioned preferred operating mode of the antenna, in which electromagnetic waves travel along the conductor structure, e.g. during the transmission, from the second end of the coaxial conductor structure in the direction toward the first end of the conductor structure.

In the transmission mode of a thusly functioning antenna, i.e. when a high-frequency transmission signal is input into the connecting end (first end), the transmission signal applied to the first end of the conductor structure between the internal conductor and the sheath conductor is essentially transmitted along the coaxial conductor structure to its second end like in a conventional "coaxial line." The discontinuity of the conductor structure created by the second end in connection with the coupling of the internal conductor end to the sheath conductor by means of the terminal structure causes electromagnetic surface waves to travel back along the conductor structure (on the outer side of the sheath conductor) in the direction of the first end of the conductor structure as mentioned above.

In this context, it is advantageous for many interesting applications if the antenna in a way generates a concentrated electromagnetic field (traveling waves) around itself, but only emits very little or no electromagnetic energy at all (due to "separating" electromagnetic waves), i.e. if the antenna is operated in the aforementioned "coupled mode."

According to an embodiment of a "coupled mode" operation of an inventive antenna, it is proposed, e.g., that more than 50% of the energy arriving on the second end of the conductor structure due to the signal input travels in the transmission mode from the second end (back in the direction of the first end) in the form of a traveling wave that is "bound to the conductor structure." Consequently, less than 50% of the energy arriving on the second end is emitted by the antenna in the form of an electromagnetic wave in this case.

In the "coupled mode" operation of an inventive antenna, it is alternatively or additionally proposed, e.g., that more than 40% of the energy being input due to the input of the transmission signal on the first end (connecting end) of the conductor structure travels in the transmission mode from the second end (back in the direction of the first end) in the form of a traveling wave that is bound to the conductor structure.

The inventive antenna has an elongate conductor structure. This conductor structure may be rigid or flexible. It is also possible that the conductor structure is composed of at least one rigid section and at least one flexible section. For example, the length of the elongate conductor structure may be greater than a (maximum) cross-sectional dimension (e.g. diameter) of the conductor structure by a factor on the order of 10 to 50.000.

The length of the elongate conductor structure may amount, e.g., to at least 0.05 m, particularly at least 0.1 m. In fact, this length is significantly greater in particularly interesting applications. For the majority of applications, however, it suffices if this length amounts to no more than 200 m, particularly no more than 100 m.

In an embodiment, it is proposed that the length of the elongate conductor structure (or the length of a signal transmission/reception section described further below) amounts to at least 2-times, particularly at least 5-times, the intended operational wavelength of the aforementioned traveling waves.

In an embodiment, it is proposed that the latter length amounts to no more than 500-times, particularly no more than 300-times, the corresponding wavelength at an intended operational signal frequency of up to 1 GHz. According to an embodiment, it is proposed that this length amounts to no more than 1000-times, particularly no more than 500-times, the corresponding operational wavelength of the traveling waves for operating frequencies of more than 1 GHz.

The inventive antenna is preferably used with an operating frequency (carrier frequency of the antenna signal in the transmission mode) in the range between 400 MHz and 6 GHz. In an embodiment, the operating frequency lies, e.g., in the range between 860 and 960 MHz (which is the usual operating frequency range for many RFID applications). In another embodiment, the operating frequency used lies in the range between 1 and 3 GHz, for example at 2.4 GHz.

The internal conductor and the sheath conductor are electrically conductive (e.g. made of metal). In the simplest case, the internal conductor has a circular cross section and the sheath conductor has an annular cross section.

The internal conductor and/or the sheath conductor may also have non-circular cross-sectional contours such as, for example, rectangular, square or oval shapes.

The internal conductor may be realized solid or in the form of a hollow conductor.

In the simplest case, the internal conductor and/or the sheath conductor have a consistent cross section over the length of the conductor structure.

An electrical insulation or a dielectric (e.g. including air) may be arranged radially between the internal conductor and the sheath conductor. An electrical insulation (e.g. of plastic) referred to as outer layer or "insulating sheath" below is preferably provided radially outside the sheath conductor, which like the internal conductor is preferably made of a metallic material.

The terminal structure is a structure that is arranged on the second end of the conductor structure and electrically connected to the internal conductor, as well as to the sheath conductor, in the above-described fashion (by means of the "internal conductor connection surface" and the "sheath conductor connection surface"). In the transmission mode of the antenna, the terminal structure serves for "decoupling" energy from the internal conductor and "coupling" this energy into the sheath conductor (in order to generate returning surface waves on the outer side of the sheath conductor).

Advantageous embodiments with respect to the design of the terminal structure are described below.

In an embodiment, it is proposed that the carrier plate has an elongate shape, e.g. a rectangular shape. The length of the carrier plate may be greater than the width of the carrier plate, e.g., by at least a factor of 2 or a factor of 3. The thickness of the carrier plate (electrically non-conductive region serving as dielectric) may lie, e.g., in the range between 0.3 mm and 2 mm.

The longitudinal direction of an elongate carrier plate may extend, e.g., parallel to or in continuation of a longitudinal direction of the conductor structure in the region of the conductor structure end.

In an embodiment, it is proposed that the first region (and accordingly the sheath conductor connection surface) is at least partially arranged adjacent to a first longitudinal end of the carrier plate, wherein this first longitudinal end of the carrier plate is preferably arranged in the region of the aforementioned "second end" of the conductor structure or adjacent to this second end of the conductor structure whereas a second longitudinal end of the carrier plate, which lies opposite of the first longitudinal end, is arranged father from the second end of the conductor structure. The first region preferably extends no farther than to the center of the carrier plate referred to the longitudinal direction thereof.

In an embodiment, it is proposed that the second region (and accordingly the internal conductor connection surface) is at least partially arranged adjacent to a second longitudinal end of the carrier plate (which lies opposite of the first longitudinal end).

In a variation, the first region is arranged adjacent to the first longitudinal end and the second region is arranged adjacent to the second longitudinal end of the carrier plate, wherein a clearance between these two regions is relatively large and amounts, e.g., to at least 50% of the carrier plate length. In this variation, the internal conductor may lead out of the sheath conductor end on the second end of the conductor structure and be extended up to the second region, namely either integrally (i.e. by "removing the sheath conductor" in this region) or by means of an electrically conductive "internal conductor extension" that is separately attached to the end of the internal conductor, in order to bridge the aforementioned clearance.

In another variation, the first region is arranged adjacent to the first longitudinal end of the carrier plate and the second region is only partially arranged adjacent to the second longitudinal end of the carrier plate, wherein the second region extends relatively far in the longitudinal direction of the carrier plate such that only a relatively small clearance, e.g. a clearance amounting to less than 10% of the carrier plate length, remains between the first and the second region.

In an embodiment that also takes into account the latter variation, it is proposed that the second region features at least one strip section that extends in a longitudinal direction of the carrier plate in a strip-shaped fashion. The length of the strip section preferably amounts to at least 50% of the carrier plate length.

In an embodiment, it is proposed that the third region (and accordingly the coupling conductor surface) features at least one strip section that extends in a longitudinal direction of the carrier plate in a strip-shaped fashion.

In the simplest case, each of the aforementioned strip sections may have a consistent width in the longitudinal direction of the carrier plate. For example, the corresponding strip section may be realized rectangular in this case. In another embodiment, it is proposed that at least one strip section has an inconsistent width in the longitudinal direction of the carrier plate. In an enhancement, the strip section width respectively increases monotonically or decreases monotonically in the longitudinal direction of the carrier plate.

In another enhancement of the embodiment with at least one strip section, it is proposed that at least one strip section has an inconsistent length in the transverse direction of the carrier plate.

This is particularly advantageous for a strip section of the third region (coupling conductor surface) because an "inconsistent overlapping length" of the overlap between the third region and the first region can thereby be realized in the transverse direction of the carrier plate, wherein this typically increases the usable bandwidth of the HF antenna signals to be transmitted and received during the operation of the antenna.

Alternatively or additionally to an inconsistent length of the coupling conductor surface, it is also conceivable to realize the sheath conductor connection surface with an inconsistent length in order to achieve an inconsistent overlapping length.

In an embodiment, it is proposed that the third region (coupling a conductor surface) overlaps at least a majority of the second region (internal conductor connection surface).

It is particularly proposed that the third region completely overlaps and preferably even considerably projects beyond the second region.

If the second region and the third region are respectively formed by (at least) one strip section, the third region preferably projects beyond the second region in the transverse direction over the entire length of the second region.

In an embodiment, it is proposed that the sheath conductor is connected (e.g. soldered or welded) to the sheath conductor connection surface by means of a contact area that is elongated in its longitudinal direction.

In an enhancement of this embodiment, it is proposed that a dimension of the sheath conductor connection surface transverse to the longitudinal direction of the sheath conductor (i.e. transverse to the longitudinal direction of the carrier plate) is in the contact area greater than a corresponding dimension of the sheath conductor. In this way, a greater tolerance is advantageously achieved in the manufacturing process during the connection of the conductor structure to the terminal structure.

In an embodiment, it is proposed that the internal conductor connection surface comprises a connecting section, which is connected to the internal conductor, and multiple strip-shaped branch sections arranged adjacent thereto, wherein the respective ends of said branch sections are respectively connected to the coupling conductor surface by means of at least one throughplating.

In an enhancement of this embodiment, the internal conductor connection surface comprises two such strip-shaped (e.g. respectively rectangular) branch sections, the respective ends of which are connected to the coupling conductor surface, e.g., by means of one or more throughplatings. In an alternative enhancement, the internal conductor connection surface comprises three strip-shaped branch sections, which may respectively also be realized, e.g., rectangularly and connected to the coupling conductor surface by means of one or more throughplatings.

If multiple strip-shaped branch sections are provided, these branch sections may extend, e.g., parallel to one another and/or respectively be shaped identical to one another.

In an embodiment, it is proposed that the coupling conductor surface comprises a connecting section, which is connected to the at least one throughplating, and multiple strip-shaped branch sections arranged adjacent thereto, wherein said branch sections extend to separate regions of an overlap with the sheath conductor connection surface.

In an enhancement of this embodiment, it is proposed that the coupling conductor surface comprises two branch sections. In another enhancement, the coupling conductor surface comprises three branch sections. A plurality of branch sections may extend, e.g., parallel to one another and/or be shaped identical to one another.

In an enhancement of the embodiment, in which the coupling conductor surface comprises multiple branch sections, it is proposed that these branch sections have different lengths such that the individual branch sections form "different overlapping lengths" of the overlap between the third region and the first region. Alternatively to a coupling conductor surface with multiple yet connected branch sections, the terminal structure may also be provided with multiple adjacently extending coupling conductor surfaces that are separated from one another.

In a preferred embodiment, a surface wave attenuation device is arranged, for example, on the outer circumference of the sheath conductor (e.g. surrounding an insulating sheath) such that it is spaced apart from the second end of the conductor structure in the longitudinal direction thereof.

Such a surface wave attenuation device is advantageously provided because the region of the aforementioned "returning traveling waves" along the conductor structure can thereby be limited in a well-defined fashion. The attenuation device serves for absorbing at least the majority of the energy of arriving returning traveling waves. In an embodiment, the attenuation device features for this purpose at least one ferrite ring that surrounds the outer circumference of the sheath conductor. It would also be possible, in particular, to arrange multiple ferrite rings, which respectively surround the outer circumference of the sheath conductor, behind one another (with or without mutual clearance) in the longitudinal direction of the conductor structure. In an enhancement, the ferrite ring (or at least one of multiple ferrite rings) is displaceably arranged on the conductor structure.

Alternatively or additionally to at least one ferrite ring surrounding the sheath conductor, the surface wave attenuation device may also feature an attenuation unit, which is inserted into the elongate two-pole coaxial conductor structure and comprises an attenuation network (of capacitive and/or inductive and/or resistive elements).

In an embodiment, the surface wave attenuation device comprises grounding of the sheath conductor. This grounding may be realized, e.g., by means of a "grounding collar" arranged on the outer circumference of the sheath conductor. Such a grounding collar may be realized, e.g., in a divided fashion and be composed of two collar halves that are connected (e.g. screwed) to one another in order to mount the grounding collar.

If a surface wave attenuation device is provided, the overall length of the coaxial conductor structure is thereby divided into a "signal line section" extending between the first end of the conductor structure and the attenuation device and a "signal transmission/reception section" extending between the attenuation device and the second end of the conductor structure. In an enhancement of the invention, it is proposed that one or more "discontinuities" (considerable local deviations of an effective impedance for the traveling waves) are provided within the signal transmission/reception section. For example, each of these discontinuities may also be implemented in the form of a ferrite ring as already described above or a similar device. The advantage of this enhancement can be seen in that the propagation of the traveling waves along the conductor structure can thereby be influenced in the desired fashion (e.g. for "wave shaping").

In a relatively long inventive antenna, the arrangement of a surface wave attenuation device may be unnecessary insofar as the traveling waves returning from the second to the first conductor structure end no longer have a very high intensity when they reach the vicinity of the first end due to the unavoidable intensity loss taking place in this case. However, the arrangement of the above-described discontinuities, which are implemented, e.g., in the form of ferrite rings or the like, at one or more locations along the antenna may also be advantageous in this case in order to purposefully influence the wave propagation.

As already mentioned above, an antenna of the type described herein is preferably operated or utilized as a traveling wave antenna in a "coupled mode." This inventive operation and this inventive utilization particularly may serve for realizing, e.g., a communication with transponders (e.g. RFID transponders) located in the surroundings of the antenna and/or a communication with components of a computer network located in the surroundings of the antenna.

During the "coupled mode" operation, the communication particularly may not be realized by means of electromagnetic radiation in the strictest sense, but rather by means of wave coupling with systems or units located within the antenna range.

Alternatively or additionally to the wireless communication, a wireless energy supply of such systems or units (e.g. sensors, particularly "intelligent sensors") can also be achieved.

Advantageous utilizations of the inventive antenna in the most general sense are, e.g., short-range information transmission; short-range radio applications and radio applications in buildings and vehicles, e.g. tunnel radio; WLAN in trains, aircraft and vehicles; RFID; short-range energy transmission, e.g. charging rechargeable batteries; wireless energy supply of radio sensors, smart phones, etc.; charging E-bikes, electric cars, etc.

According to another aspect of the invention, an antenna of the type described herein is operated as a communication component that is integrated into a larger technical device. The technical device may consist, for example, of a cabinet or a rack (particularly a cabinet or rack with IT components) or of another piece of furniture, particularly for storing articles to be inventoried. It may furthermore consist, e.g., of parts of a building or a vehicle such as certain walls, braces, doors or door frames. In this case, the antenna particularly may be used for the communication with transponders (e.g. RFID transponders) located in the immediate surroundings of the antenna, wherein such transponders are arranged, for example, on objects that are stored or moved (out of or into the technical device) in the region of the corresponding technical device. In this way, the communication between the antenna and the respective transponders particularly makes it possible to create an inventory, i.e. to detect objects provided with transponders (e.g. IT components such as servers, switches, etc.). According to the invention, detection errors are advantageously prevented due to the preferably short range of this communication.

Alternatively or additionally to "information-storing" transponders, one or more sensors (or transponders "equipped with sensor technology"), which do not feature batteries and are supplied with electrical energy via the antenna field, may also be arranged on the antenna. In this way, basically any physical parameters can be detected along the antenna depending on the respective sensor type.

Alternatively or additionally to the arrangement of such sensors directly on the antenna, it is also possible to arrange, e.g., passive sensors (that receive their electrical energy from the antenna field) on or in the technical device within the antenna range. The information acquired with such sensors can also be easily read out due to the communication via the antenna and subsequently analyzed.

For example, the conductor structure or a signal transmission/reception section of the coaxial conductor structure of an antenna integrated, e.g., into a technical device may extend linearly or feature at least one angled section and/or at least one curved section. For example, an altogether meander-shaped extent may be realized.

Such a complex extent (e.g. either two-dimensional or three-dimensional) particularly allows a purposeful coverage of the area, in which the communication and/or energy transmission should take place, with a very short antenna range. With respect to very long antennas with a complex extent, it is particularly proposed that the antenna is assembled from multiple segments (e.g. by means of electrical plug-type connectors). Furthermore, T-pieces may also be used in order to realize junctions along the antenna. In this way, a branching into two or more than two signal transmission/reception sections (on the ends of which a terminal structure of the type described herein is respectively arranged) can be realized, e.g., on the end of a signal line section by means of a distribution piece.

In an enhancement of the invention, it is proposed that the antenna has a "modular design," which may particularly be realized by providing one or more electrical contacts (e.g. plug-type and/or screw-type connections) between the first end of the conductor structure (connecting end) and the second end of the conductor structure (terminal end), wherein said electrical contacts accordingly define individual "modules," from which the antenna is assembled.

In a corresponding embodiment, it is proposed that a surface wave attenuation device of the above-described type is equipped with a corresponding connector (e.g. an electrical plug or the like) on one or both of its ends. Such a connector may alternatively or additionally also be arranged, in particular, on the second end of the conductor structure in order to connect the terminal structure comprising the carrier plate. The terminal structure may accordingly also be equipped with a (mating) connector. This (mating) connector may be electrically and mechanically connected to the carrier plate, e.g., by being soldered on the sheath conductor connection surface and on the internal conductor connection surface.

A significant advantage of such a modular design of the antenna can be seen, e.g., in that conventional and commercially available components such as, e.g., "coaxial cables" can be used for constructing part of the antenna and merely have to be supplemented with the respectively required additional modules in order to realize an inventive antenna. A conventional coaxial cable particularly may be used for forming the inventive conductor structure. If a surface wave attenuation device is provided, it may be formed, e.g., by a corresponding attenuation module that is supplemented with conventional coaxial cables on both sides (e.g. by means of conventional electrical plug/screw-type connections) in order to form the signal line section on the one hand and the signal transmission/reception section of the antenna on the other hand by means of the two coaxial cables.

According to an enhancement, it is proposed that the region of the second end of the conductor structure and the terminal structure is shielded with a shielding structure (e.g. of electrically conductive metallic material) in order to minimize the emission of electromagnetic radiation from this region. For example, the shielding structure may have the shape of a hollow cylinder that is closed on one end such that it can be attached and fixed (e.g. bonded) to the antenna end in the form of a "shielding pot" of sorts.

BRIEF DESCRIPTION OF THE DRAWINGS

The invention is described in greater detail below with reference to exemplary embodiments that are illustrated in the attached drawings. In these drawings.

DETAILED DESCRIPTION

Figure 1:
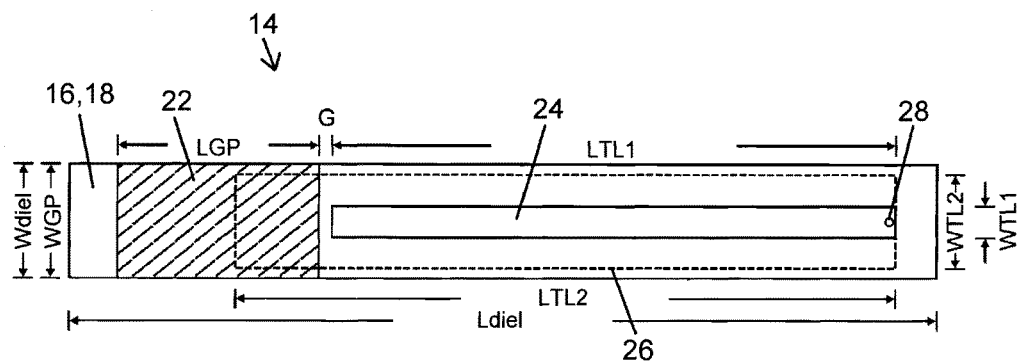
FIG. 1 shows a top view of a terminal structure for an antenna according to an exemplary embodiment.
Figure 2:
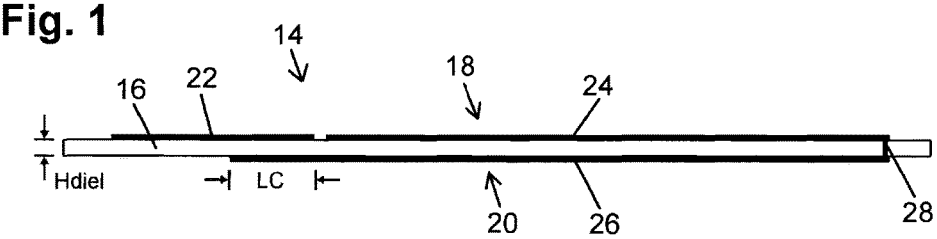
FIG. 2 shows a side view of the terminal structure according to FIG. 1.

FIGS. 1 and 2 show an exemplary embodiment of a terminal structure 14 that is suitable for use in the present invention and comprises an electrically insulating carrier plate 16, which is realized rectangularly in the example shown and has an upper side 18 and the underside 20.

The terminal structure 14 furthermore comprises an electrically conductive sheath conductor connection surface 22 (hatched in FIG. 1) that extends over a first region of the carrier plate on the upper side 18 of the carrier plate 16, an electrically conductive internal conductor connection surface 24 that extends over a second region of the carrier plate 16, which is spaced apart from the first region of the carrier plate 16, on the upper side 18 of the carrier plate 16, and an electrically conductive coupling conductor surface 26 (dashed in FIG. 1) that extends over a third region of the carrier plate 16 on the underside 20 of the carrier plate 16, wherein the third region respectively overlaps the first region and the second region of the carrier plate 16.

The terminal structure 14 ultimately also comprises a throughplating 28 that electrically connects the internal conductor connection surface 24 on the upper side 18 of the carrier plate 16 to the coupling conductor surface 26 on the underside 20 of the carrier plate 16. However, multiple throughplatings may alternatively also be provided for connecting the internal conductor connection surface 24 to the coupling conductor surface 26.

In the exemplary embodiment of the terminal structure 14 shown, the carrier plate 16 has an elongate rectangular shape. The electrically conductive surfaces 22, 24, 26 are conventionally realized in the form of metallization layers (e.g. copper coatings, etc.) on the respective sides 18 and 20 of the electrically insulating carrier plate 16 in the example shown. The carrier plate 16 may consist, e.g., of a material that is commonly used for printed circuit boards (e.g. epoxy resin, ceramic, etc.).

In the example shown, the electrically conductive surfaces 22, 24, 26 are respectively realized with an elongate rectangular shape.

FIG. 1 and FIG. 2 show a dimensioning of the carrier plate 16 and the surfaces 22, 24, 26. In this case, the following designations apply:

Ldie1: length of the carrier plate
Wdie1: width of the carrier plate
LGP: length of the sheath conductor connection surface
WGP: width of the sheath conductor connection surface
LTL1: length of the internal conductor connection surface
WTL1: width of the internal conductor connection surface
LTL2: length of the coupling conductor surface
WTL2: width of the coupling conductor surface
G: longitudinal clearance between sheath conductor connection surface and internal conductor connection surface
Hdie1: thickness of the carrier plate
LC: overlapping length between the first region (sheath conductor connection surface) and the third region (coupling conductor surface).

Advantageous "dimensioning rules" for this exemplary embodiment (FIGS. 1 and 2) and the other exemplary embodiments are provided further below.

According to FIG. 1 and FIG. 2, the third region (coupling conductor surface 26) only partially overlaps the first region (sheath conductor connection surface 22), but completely overlaps and even projects beyond the second region (internal conductor connection surface 24).

Figure 3:
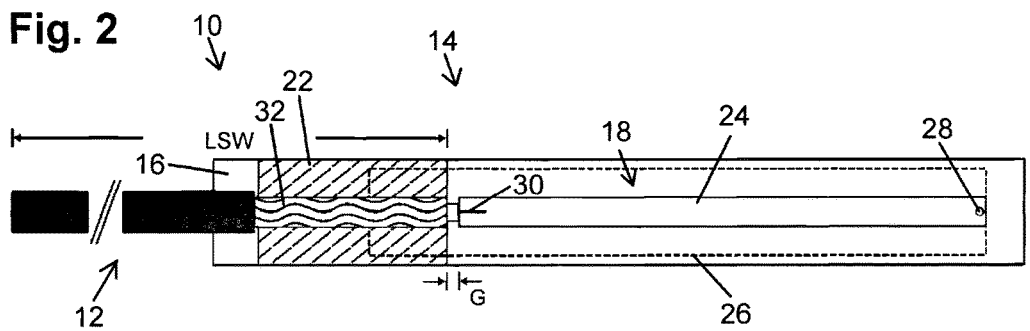
FIG. 3 shows a top view of an antenna according to an exemplary embodiment, which is realized with the terminal structure according to FIGS. 1 and 2.
Figure 4:
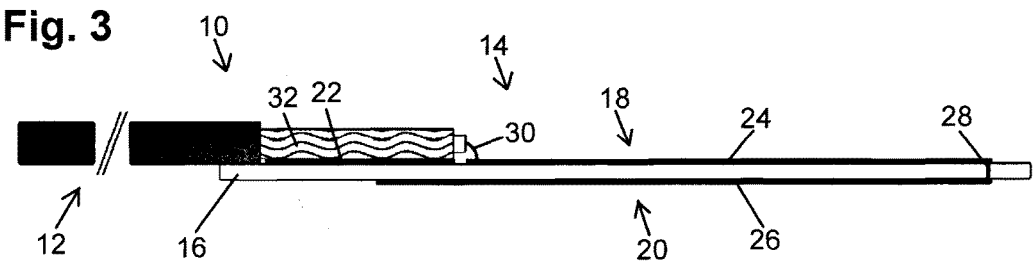
FIG. 4 shows a side view of the antenna according to FIG. 3.

FIG. 3 and FIG. 4 show an exemplary embodiment of an antenna 10 that comprises the above-describes terminal structure 14 (FIGS. 1 and 2), as well as an elongate two-pole conductor structure 12 that comprises an internal conductor 30 and a sheath conductor 32 coaxial a surrounding the internal conductor (hatched in an undulating fashion in FIG. 3 and FIG. 4) and is connected to the terminal structure 14 on a first longitudinal end thereof. In the simplest case, the coaxial conductor structure 12 consists of a conventional "coaxial cable." According to FIGS. 3 and 4, such a conventional coaxial cable furthermore comprises an electrically insulating intermediate layer (e.g. of plastic) arranged radially between the internal conductor 30 and the sheath conductor 32, as well as an electrically insulating outer layer (e.g. of plastic) arranged radially outside the sheath conductor 32.

A right end of the sheath conductor 32 in the figures is electrically connected to the sheath conductor connection surface 22 and a right end of the internal conductor 30 in the figures is electrically connected to the internal conductor connection surface 24 (and thereby bridges the gap length G). Each of these connections may be realized, e.g., in the form of a soldered or welded connection.

The right end of the internal conductor 30 is preferably connected to the internal conductor connection surface 24 with little clearance from the left end thereof (e.g. a clearance amounting to less than 5% of the length of the internal conductor connection surface 24).

In order to ensure that these electrical connections can be easily produced, it is preferred that the outer layer arranged above the sheath conductor 32 is removed (preferably over the entire length LGP) from the sheath conductor in its contact area and the layers arranged above the internal conductor 30 (intermediate layer, sheath conductor and outer layer) are removed from the internal conductor in its contact area.

The antenna 10 shown particularly can be used for short-range applications, for example RFID applications or short-range energy transmission applications. For this purpose, a transmitter and/or receiver for an antenna signal to be transmitted with the antenna 10 or an antenna signal to be received by the antenna 10 may be provided on a first end (in the figures the left end) of the conductor structure 12 and equipped, e.g., with a conventional "coaxial connector" (a corresponding coaxial connector is illustrated, e.g., on the far left in FIG. 12). Such a coaxial connector makes it possible to respectively input and output the antenna signal (applied between internal conductor 30 and sheath conductor 32) on the first end of the conductor structure 12.

A second end (in the figures the right end) of the conductor structure 12 is connected to the terminal structure 14 in the above-described fashion.

In a transmission mode of the antenna 10, i.e. when an antenna signal to be transmitted is input on the first end of the coaxial conductor structure 12, this antenna signal travels along the conductor structure 12 up to the second end (terminal end) with the terminal structure 14 connected thereto and is reflected to a greater or lesser extent at this location in order to travel back along the sheath conductor 32 from the second end in the direction of the first end of the conductor structure 12 in the form of a bound traveling wave (surface wave).

In comparison with a "correctly terminated coaxial line structure," the coaxial line structure illustrated in FIGS. 3 in 4, which in a way represents an "opened coaxial line structure" 12 with interrupted ground current path on its second end, causes the electrical return current (ground current) to be "diverted" to the outer side of the coaxial shielding (=sheath conductor 32) and its flow direction to be reversed.

If the operating mode is chosen accordingly, e.g. with respect to the frequency and power of the antenna signal being input, the antenna 10 is capable of generating an electromagnetic alternating field around itself while emitting relatively little electromagnetic energy. In fact, the antenna 10 can be operated as a traveling wave antenna in a "coupled mode" in order to easily control the (preferably relatively short) range of the antenna 10.

Exemplary details of the terminal structure 14, which are advantageous in this respect and can be used in the inventive antenna individually or in any combination, are listed below:

The sheath conductor connection surface 22 is arranged adjacent to the first longitudinal end (in the figures the left end) of the carrier plate 16 and extends over less than 30% of the length of the carrier plate 16 in the longitudinal direction.

The internal conductor connection surface 24 is realized in the form of a strip that extends in the longitudinal direction of the carrier plate 16 in a strip-shaped fashion over more than 50% of the length of the carrier plate 16. One of the ends of this strip is arranged with a relatively small longitudinal clearance G from the sheath conductor connection surface 22. This longitudinal clearance G is bridged by an end section of the internal conductor 30 as shown and amounts to less than 5% of the length of the carrier plate 16 in this example. This end of the strip is located in a left to central region of the carrier plate 16 whereas the opposite end of the strip is arranged in a right region with a relatively small clearance from the second longitudinal end of the carrier plate 16.

The coupling conductor surface 26 is realized in the form of a strip that extends in the longitudinal direction of the carrier plate 16. The left end of this strip overlaps the sheath conductor connection surface in the longitudinal direction by a length that preferably amounts to 20% to 80% of the length LGP of the sheath conductor connection surface 22. The left end of the coupling conductor surface 26 is insofar located much farther to the left than the left end of the internal conductor connection surface 24. The right ends of the internal conductor connection surface 24 and the coupling conductor surface 26 are located at approximately the same location referred to the longitudinal direction.

The internal conductor connection surface 24 is located approximately in the center of the carrier plate 16 referred to the transverse direction of the carrier plate 16. The coupling conductor surface 26 projects beyond the internal conductor connection surface 24 (in the transverse direction) on both sides thereof. The coupling conductor surface 26 is more than twice as large as the internal conductor connection surface 24.

The sheath conductor 32 is connected (e.g. soldered) to the sheath conductor connection surface 22 by means of a contact area that is elongated in the longitudinal direction of the sheath conductor. This strip-shaped connection (in this case: soldering) extends over more than 20% of the length of the carrier plate 16.

In this contact area, a dimension of the sheath conductor connection surface 22 transverse to the longitudinal direction of the sheath conductor 32 is more than twice as large as a dimension of the sheath conductor 32.

The right end of the sheath conductor 32 is referred to the longitudinal direction of the carrier plate 16 arranged approximately at the location, at which the right end of the sheath conductor connection surface 22 is located. When the contact connection between the sheath conductor 32 and the sheath conductor connection surface 22 is produced, it is preferred to position the right end of the sheath conductor 32 in such a way that it is at best slightly set back leftward relative to the right end of the sheath conductor connection surface 22 (and therefore does not project beyond the end of the sheath conductor connection surface 22 in the opposite direction, i.e. rightward).

In contrast to the example illustrated in FIGS. 3 and 4, it would also be possible to provide two carrier plates, which are held parallel to one another, e.g. by means of spacers, instead of the carrier plate 16. In this case, the dielectric located between the conductor surfaces on the upper side and the underside is partially realized in the form of air between the two conductor plates.

With respect to high-frequency engineering, the terminal structure 14 is preferably realized in such a way that a largely loss-free termination impedance is realized at the respective antenna operating frequency.

Examples of advantageous dimensioning rules with respect to the dimensions of various components of the antenna 10 indicated in FIGS. 1-4 are listed below, wherein said dimensioning rules may apply to an inventive antenna individually or in any combination:

Ldie1(min)=(LGP+G+LTL1)
Ldie1(max)=(LGP+G+LTL1)×1, with 1≤i≤3
Wdie1(min)=WTL2 or Wdie1(min)=WGP if WGP>WTL2
Wdie1(max)=WTL2×1.5 or Wdie1(max)=WGP×1.5 if WGP>WTL2
0.01 mm≤Hdie1≤4 mm
0.5×øcoax≤Hdie1≤5×øcoax, with øcoax=diameter of the conductor structure
LGP: øcoax≤LGP≤10×øcoax
WGP=Wdie1 or WTL2≤WGP≤WTL2×j, with 1≤j≤3
0.8×øcoax≤WGP≤1.5×øcoax
LTL1 is at least approximately equal to (λ/8−G−Via)×k, with 0.5≤k≤2 and λ=wavelength and Via=length (height) of the throughplating
0.1×WTL2≤WTL1≤WTL2

The height (thickness) of the internal conductor connection surface at least approximately corresponds to:
a cross-sectional dimension (e.g. diameter) of the internal conductor of the coaxial conductor structure and/or
lies in the range between 0.01 and 0.4 mm or
lies in the range between 0.5 and 5 mm (particularly for higher antenna signal powers, e.g., of at least 100 W)
LTL2=(λ/8−Via)×m, with 1≤m≤2
WTL2>WTL1 (advantageous, e.g., for achieving a higher bandwidth)
WTL1≤WTL2≤10×WTL1

The height (thickness) of the coupling conductor surface lies in the range between 0.01 and 0.4 mm or
lies in the range between 0.5 and 5 mm (particularly for higher antenna signal powers, e.g., of at least 100 W)
0≤LC≤0.3×LTL2.

Even short line lengths in the millimeter range significantly affect the frequency response (impedance) of the terminal structure (14), particularly at higher signal frequencies (e.g. starting at 400 MHz). It is therefore particularly preferred to also incorporate, e.g., the length (Via) of the throughplating (28), as well as the gap clearance (G), into the dimensioning of the antenna components.

In the example according to FIGS. 3 and 4, the overlap between the ground conductor connection surface 22 and the coupling conductor surface 22 realizes a capacitance at this location. In case of an overlapping length LC=0, only the terminal edges of the coupling conductor surface 26 and the ground conductor connection surface 22 are effective in forming the capacitance. It is therefore generally preferred that LC>0 as shown. However, it is not ruled out that at least one discrete component (capacitor) is additionally arranged, e.g. soldered, on the overlapping region. One terminal of this component would be connected to the coupling conductor surface 26 and the other terminal of this component would be connected to the ground conductor connection surface 22 in an electrically conductive fashion (e.g. soldered thereto by means of a throughplating). It is also conceivable to arrange one or more discrete components (inductors such as, e.g., coils) along the internal conductor connection surface and/or the coupling conductor surface.

In the following description of other exemplary embodiments, the same reference symbols are used for identically acting components and respectively supplemented with a lowercase letter in order to distinguish the respective embodiments. In this case, only the essential differences between the respectively described embodiment and the above-described exemplary embodiment or embodiments are discussed and we hereby explicitly refer to the description of the preceding exemplary embodiments in other respects.

Figure 5:
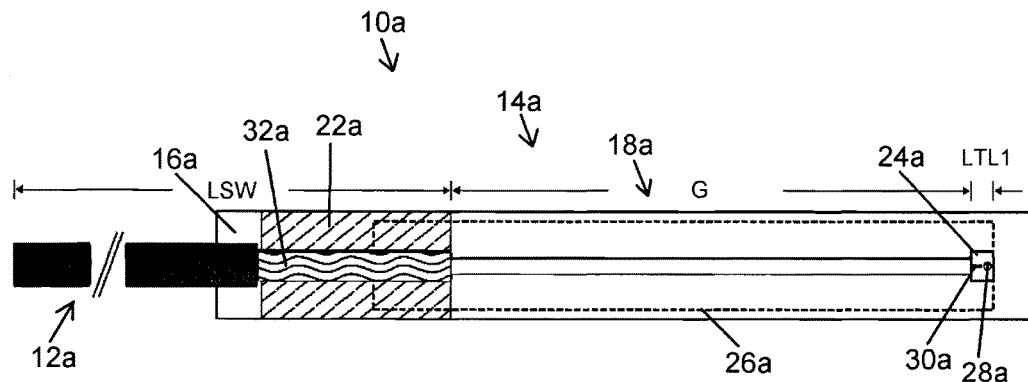
FIG. 5 shows a top view of an antenna according to another exemplary embodiment.
Figure 6:
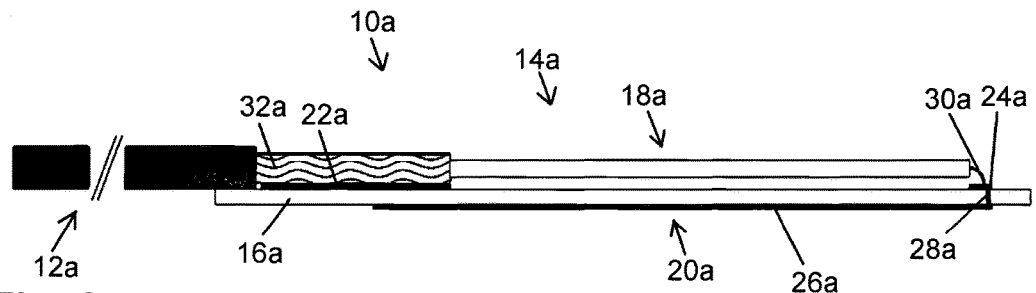
FIG. 6 shows a side view of the antenna according to FIG. 5.

FIGS. 5 and 6 show an antenna 10*a* according to another exemplary embodiment. With respect to its design and function, the antenna 10*a* essentially corresponds to the above-described antenna 10. Only the internal conductor connection surface and its electrical connection to the coaxial conductor structure are modified. In the antenna 10*a*, an internal conductor connection surface 24*a* is arranged such that it only extends adjacent to the second longitudinal end of the carrier plate 16 and has a length amounting to less than 5% of the length of the carrier plate 16 (directly in the region of a throughplating 28a). Accordingly, the longitudinal clearance G between the sheath conductor connection surface 22a and the internal conductor connection surface 24a is significantly greater in this case (amounting to more than 50% of the length of the carrier plate 16a), wherein an internal conductor 30a of a conductor structure 12a extends correspondingly far rightward in order to bridge this longitudinal clearance. This end section of the internal conductor 30a therefore projects very far beyond the right end of a sheath conductor 32a and functionally replaces the elongate internal conductor connection strip in the exemplary embodiment according to FIG. 3 and FIG. 4.

FIGS. 7 to 11 show examples of other terminal structures that can be used, e.g., in connection with a conductor structure of the above-described type (e.g. as illustrated in FIG. 3 and FIG. 4).

Figure 7:
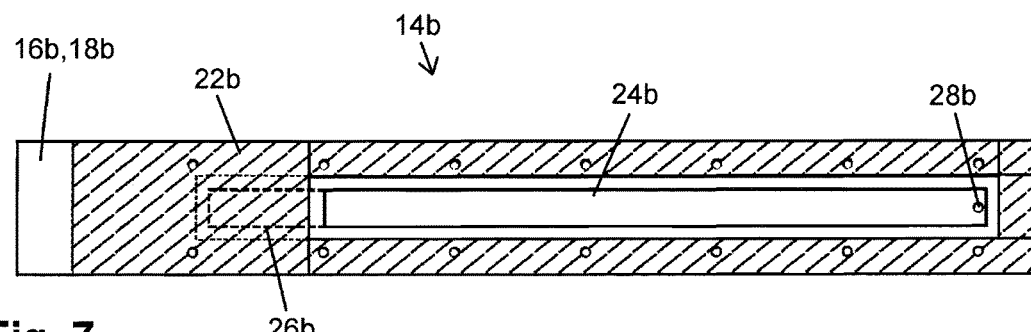
FIG. 7 shows a top view of a terminal structure according to another exemplary embodiment.

FIG. 7 shows a terminal structure 14b, in which a carrier plate 16b and electrically conductive surfaces 22b, 24b, 26b are realized similar to the example illustrated in FIGS. 1 and 2, but with the following modifications: the sheath conductor connection surface 22b is not only arranged adjacent to the first longitudinal end of the carrier plate 14b, but also frames the internal conductor connection surface 24b on an upper side 18b of the carrier plate 16b. Another modification can be seen in that not only the coupling conductor surface 26b, which in this case has the same width, e.g., as the internal conductor connection surface 24b, is arranged on an underside 20b as electrically conductive surface, but also an additional surface that frames the coupling conductor surface 26b. The latter surface on the underside 20b is arranged approximately congruent with the sheath conductor connection surface 22b that frames the internal conductor connection surface 24 on the upper side (and only slightly modified on the left end in accordance with the overlap between the coupling conductor surface 26b and the sheath conductor connection surface 22b).

In the example according to FIG. 7, the conductor surfaces (preferably on the upper side and underside) therefore are (preferably completely) surrounded by ground surfaces in accordance with the principle of a coplanar line such that emissions of electromagnetic waves via the strip lines 24b, 26b are advantageously prevented or at least suppressed. In contrast to the example illustrated in FIG. 7, the strip lines 24b, 26b may also be realized with different widths.

Figure 8:
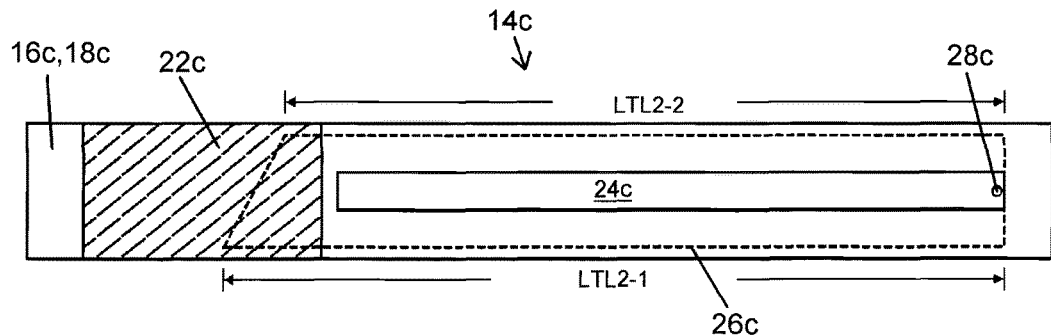
FIG. 8 shows a top view of a terminal structure according to another exemplary embodiment.

FIG. 8 shows a terminal structure 14c according to another exemplary embodiment. In contrast to the example according to FIG. 1, the length of a coupling conductor surface 26c in the terminal structure 14c is not consistent in the transverse direction, but rather varied, wherein the variation is in this example realized such that the length decreases monotonically from one lateral end to the other lateral end and the "overlapping length" between the coupling conductor surface 26c and a sheath conductor connection surface 22c therefore is also not consistent in the transverse direction, but likewise varies monotonically. In the example shown, a left end of the coupling conductor surface 26 does not extend in the transverse direction of the carrier plate as in the example according to FIG. 1, but rather at an angle to the transverse direction. This angle may lie, e.g., in the range between 10° and 40°. In FIG. 8, the "greatest length" of the coupling conductor surface 26c is identified by the reference symbol LTL2-1 and the "smallest length" of the coupling conductor surface 26c is identified by the reference symbol LTL2-2.

This variation of the overlapping length advantageously increases the usable signal bandwidth during the operation of the antenna. The same advantageous effect is also realized in the embodiments described below with reference to FIG. 9 and FIG. 10.

Figure 9:
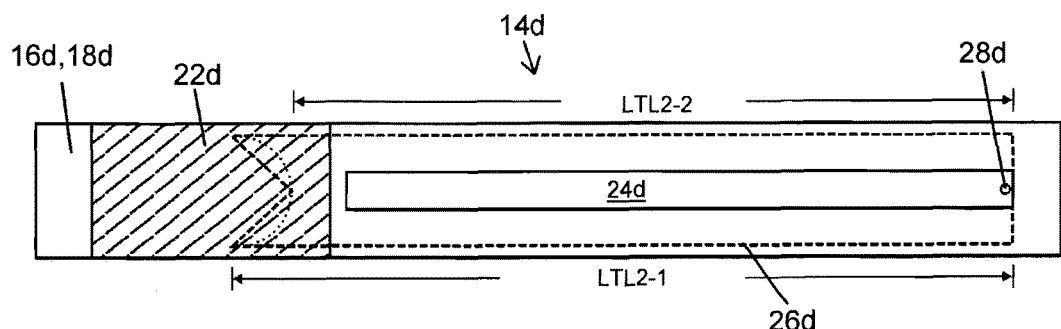
FIG. 9 shows a top view of a terminal structure according to another exemplary embodiment.

FIG. 9 shows a terminal structure 14d according to another exemplary embodiment. In contrast to the example according to FIG. 8, a variation of the "overlapping length" between the coupling conductor surface 26d and the sheath conductor connection surface 22d is in the antenna 14d according to FIG. 9 realized in such a way that the overlapping length (and also the length of the coupling conductor surface 26d) initially decreases monotonically starting from one lateral end in order to once again increase monotonically toward the other lateral end. In other words, the left end of the coupling conductor surface 26d is recessed in the overlapping region. In the example shown, this recess is realized symmetric to a longitudinal center line of the carrier plate 16d and, e.g., has linearly extending recess flanks (as illustrated in a dashed fashion in FIG. 9) or alternatively a bulgy, e.g. approximately semicircular boundary (as illustrated in a dotted fashion in FIG. 9).

Figure 10:
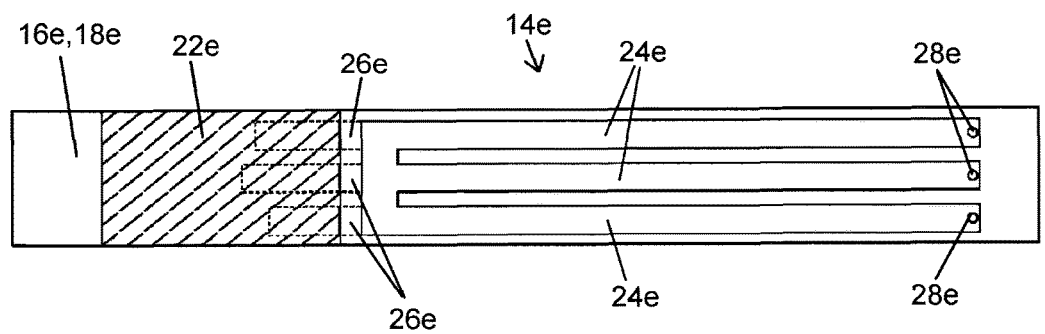
FIG. 10 shows a top view of a terminal structure according to another exemplary embodiment.

FIG. 10 shows an antenna 14e according to another exemplary embodiment. In contrast to the example according to FIG. 1, an internal conductor connection surface 24e and a coupling conductor surface 26e are modified in the antenna 14d.

The internal conductor connection surface 24e features a connecting section to be connected to the internal conductor of a corresponding coaxial conductor structure and multiple (in this case three) adjoining strip-shaped branch sections, the respective ends of which are connected to the coupling conductor surface 26e by means of a respectively assigned throughplating 28e. Multiple throughplatings may alternatively also be provided on each branch section.

A number of coupling conductor surfaces 26e, which corresponds to the number of branch sections of the internal conductor connection surface 24e, in this case three coupling conductor surfaces, are provided instead of a single coherent coupling conductor surface, wherein said coupling conductor surfaces extend in a strip-shaped fashion approximately congruent with the branch sections of the internal conductor connection surface 24e, but are extended on their left ends such that three overlapping regions for overlapping with a sheath conductor connection surface 22e are formed. In this case, the three overlapping regions have different overlapping lengths. This is achieved in that the three coupling conductor surfaces 26e have different lengths.

If the internal conductor connection surface (e.g. the internal conductor connection surface 24e according to this example) features multiple strip-shaped branch sections (alternatively: multiple separate "individual conductor surfaces") with identical or different lengths, the width of the ground conductor connection surface (e.g. the ground conductor connection surface 22e in this example) preferably is at least approximately identical to the overall width of the internal conductor connection surface(s). The width of the gaps between the strips of the internal conductor connection surface (and/or between strip-shaped sections of the coupling conductor surface) may lie, e.g., in the range between 0.3 and 5 mm.

Figure 11:
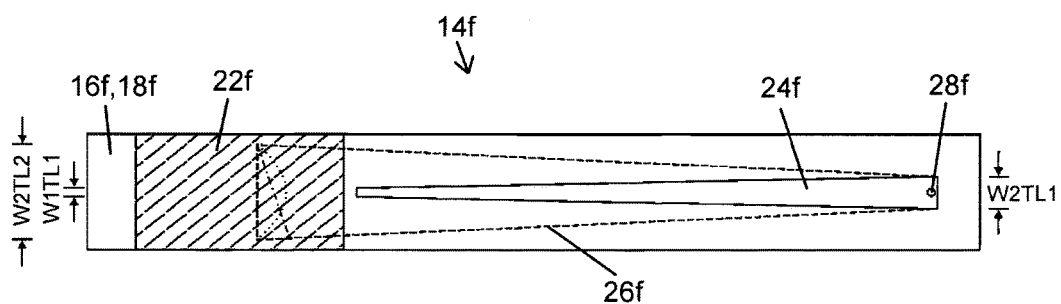
FIG. 11 shows a top view of a terminal structure according to another exemplary embodiment.

FIG. 11 shows a terminal structure 14f according to another exemplary embodiment. In contrast to the example according to FIG. 1, an internal conductor connection surface 24f and a coupling conductor surface 26f are modified in the terminal structure 14f according to FIG. 11.

The internal conductor connection surface 24f has an inconsistent width in the longitudinal direction of the carrier plate 16f. In the example shown, this width increases monotonically from the left end toward the right end (at a throughplating 28f). In the example shown, the internal conductor connection surface 24f is realized trapezoidal in the form of an elongate strip.

The coupling conductor surface 26f has an inconsistent width in the longitudinal direction of the carrier plate 16f. In the example shown, this width increases monotonically from the right end (at the throughplating 28f) toward the left end (in the overlapping region). The coupling conductor surface 26f is trapezoidal in the example shown.

In the example shown, the internal conductor connection surface 24f and the coupling conductor surface 26f end at the same rightward location referred to the longitudinal direction of the carrier plate 16f.

In FIG. 11, W1TL1 identifies the "initial width" of the internal conductor connection surface 24f, W2TL1 identifies the "final width" of the internal conductor connection surface 24f and W2TL2 identifies the "final width" of the coupling conductor surface 26f. According to this example, the final width of the internal conductor connection surface 24f preferably corresponds to the initial width of the coupling conductor surface 26f. In this context, øcoax≤W1TL1 preferably applies. Furthermore, the following exemplary substitutions with respect to the above-cited dimensioning rules are also advantageous: WTL1→W2TL1 and WTL2→W2TL2.

The example according to FIG. 11 may also be modified to the effect that the "length variation" described above with reference to the examples according to FIGS. 8 and 9 is used, i.e. an inconsistent length of the coupling conductor surface 26f over the width of the coupling conductor surface 26f (see the exemplary boundaries of the coupling conductor surface 26f illustrated in a dash-dotted and a dotted fashion in FIG. 11), in order to achieve an even greater bandwidth.

Figure 12:
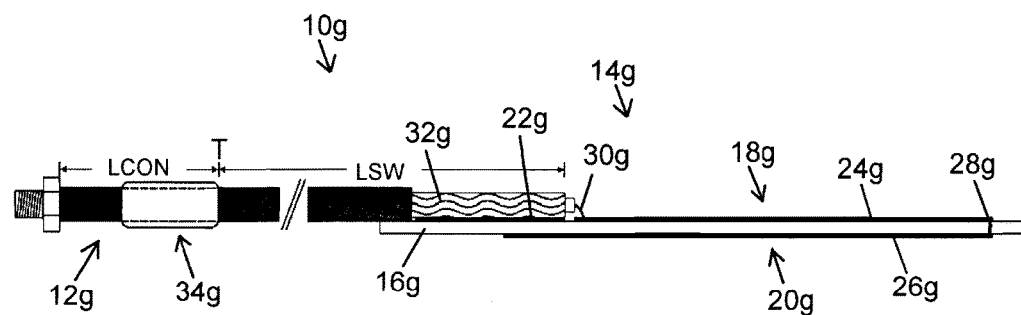
FIG. 12 shows a side view of an antenna according to another exemplary embodiment.

FIG. 12 shows an antenna 10g according to another exemplary embodiment. With respect to its design and function, the antenna 10g consisting of a conductor structure 12g and a terminal structure 14g connected thereto essentially corresponds to the above-described antenna 10 according to FIG. 3 and FIG. 4. Only the conductor structure 12g is modified to the effect that a surface wave attenuation device, in this case a ferrite ring 34g arranged on the outer circumference of the sheath conductor 32g (such that it surrounds an insulating outer layer), is provided between the two ends of the conductor structure 12g referred to the longitudinal direction of the conductor structure 12g.

The ferrite ring 34g is advantageous insofar as the region of the "returning traveling waves" along the conductor structure 12g can thereby be limited in a well-defined fashion. An overall length of the conductor structure 12g is divided into an "signal line section" and a "signal transmission/reception section" by the ferrite ring 34g (or alternatively by any other surface wave attenuation device) at this location. In FIG. 12, the length of the signal line section is identified by LCON and the length of the signal transmission/reception section is identified by LSW.

For example, different surface wave attenuation options may generally be considered:

Without interruption of the conductor structure (e.g. coaxial cable): by means of one or more ferrite rings that enclose the conductor structure more or less tightly. Only one exemplary ferrite ring (ferrite ring 34g) is illustrated in FIG. 12. For example, a conventional coaxial cable thereby transforms into a surface wave line at the location T in FIG. 12.

With interruption of the conductor structure: by inserting a common mode filter (e.g. a "common mode line filter"), e.g. on a circuit carrier such as a printed circuit board.

Galvanic grounding of the sheath conductor (e.g. with a metallic sheath clamp).

The conductor structure 12g described with reference to the example in FIG. 12 may also be used, e.g., in connection with terminal structures of the type described above with reference to the preceding exemplary embodiments.

In summary, the design, function and advantages of the above-described exemplary antennas and of the above-described exemplary terminal structures used for the construction of such antennas can be outlined as follows:

A first main component of the antenna is the coaxial conductor structure, which may consist, e.g., of a flexible or semi-rigid cable or a rigid structure, which is connected to the terminal structure on its second end (terminal end).

A second main component of the antenna is the terminal structure, which "interrupts the coaxial structure" and therefore induces the generation of returning surface waves on the outer side of the sheath conductor, e.g. in the transmission mode. For this purpose, a "capacitive coupling" of the antenna signal arriving on the end of the internal conductor to the sheath conductor is particularly realized by means of the internal conductor connection surface, the throughplating(s) and the coupling conductor surface. This capacitive coupling is specifically realized with the "overlap" between the third region (coupling conductor surface) and the first region (internal conductor connection surface).

An optional surface wave attenuation device, which is formed, e.g., by one or more ferrite rings and provided at a location along the conductor structure, limits the effective antenna length for the transmission/reception (transmission/reception section LSW). In addition to an adjustment of this antenna length, the position of the attenuation device, particularly the position of the first ferrite ring (lying closest to the terminal end of the conductor structure) if multiple spaced-part ferrite rings are provided, also affects the properties of the attenuation device and therefore the properties of the returning surface waves.

The transmission/reception section (length LSW) designates the section of the surface wave propagation on the outer side of the sheath conductor (coaxial shielding). Without boundary, the transmission/reception section practically would extend so far from the terminal end until no current can any longer be measured due to power losses. The example according to FIG. 12 shows how the length LSW can be very easily adjusted. For example, the following may apply to the length LSW: LSW(min)=LGP and/or LGP≤LSW≤200×λ and/or LSW(max)=100 m.

With respect to the desired generation of returning surface waves, it is generally advantageous if a cumulative overall length of the "path," which extends from the end of the sheath conductor along the internal conductor section protruding therefrom and then along the internal conductor connection surface, the throughplating and the coupling conductor surface, at least approximately represents a "quarter wavelength" of an antenna signal used during the operation of the antenna. A carrier frequency of the antenna signal may lie, e.g., in the range between 50 and 5.000 MHz.

The specific position of multiple optionally provided ferrite rings, particularly the position of the first ferrite ring, also significantly affects the impedance of the antenna. In this respect, an adjustability of at least one ferrite ring, particularly at least the first of multiple ferrite rings, can be advantageously used for adjusting the impedance (e.g. as close as possible to 50Ω or the impedance level of the coaxial structure).

A suitable geometry of the antenna and a corresponding operating mode (e.g. carrier frequency of the antenna signals) make it possible for the majority of a transmission signal to travel along the "signal transmission/reception section" in the form of a sheath wave such that only comparatively little high-frequency energy is emitted ("coupled mode").

An arrangement of multiple ferrite rings for realizing the surface wave attenuation device particularly leads to a very effective suppression of the sheath waves on the remainder of the conductor structure (signal line section). The transition between the two aforementioned sections is defined by the position of the attenuation device along the conductor structure. According to an enhancement, it is insofar proposed to arrange the attenuation device in such a way that it can be altogether displaced along the conductor structure.

A cumulative overall length of the path, which extends from the end of the sheath conductor along the internal conductor section protruding therefrom and then along the internal conductor connection surface, the throughplating and the coupling conductor surface, may be chosen such that the desired impedance, e.g. for achieving the highest return loss possible of the antenna, is adjusted in combination with the (preferably variable) position of the ferrite ring (or, e.g., the first of multiple ferrite rings).

The length of an inventive antenna and the lengths of the individual sections thereof (conductor structure, internal conductor section protruding from the sheath conductor, signal path of the internal conductor connection surface, throughplating length and signal path of the coupling conductor surface) can be adapted to the respective application.

Since no surface wave attenuation device is provided in the example according to FIGS. 1-4, the entire conductor structure 12 can be regarded as a signal line section and as a signal transmission/reception section. This is realized differently, e.g., in the example according to FIG. 12, in which the length of the conductor structure 12g is divided into a signal line section with the length LCON and a signal transmission/reception section with the length LSW.

For example, these lengths may respectively lie in the following ranges: LCON may lie between 0.05 and 1 m, the length of the surface wave attenuation device may lie between 0.05 and 0.5 m, LSW may lie between 0.2 and 10 m, and G+LTL1+(length of the throughplating)+LTL2, which depending on the wavelength is preferably chosen as quarter wavelength, may lie between 0.03 and 0.15 m.

If multiple ferrite rings are provided, a mutual clearance (clear width) between the ferrite rings may lie, e.g., in the range between 5 and 20 mm.

The ferrite rings used for realizing the attenuation device, i.e. the ferrite ring 34g in the example according to FIG. 12, should be adapted to the cross-sectional dimension or the diameter of the conductor structure (including a potentially provided outer layer (insulating sheath), preferably with an annular gap of less than 3 mm between the conductor structure and the inner circumference of the ferrite ring. In an embodiment, the impedance of each ferrite ring is greater than 100Ω at the operating frequency of the antenna. Suitable ferrite rings are commercially available, for example, under the designation "WE-AFB EMI Suppression Axial Ferrite Bead" from the firm Würth Elektronik, 74638 Waldenburg, Germany.

In an advantageous embodiment of the inventive antenna, it is proposed that the attenuation device features multiple "discontinuities" of this type, e.g. ferrite rings, which differ with respect to their impedance. This particularly makes it possible to realize, e.g., a wave attenuation, in which the proportion of reflected traveling waves arriving at the attenuation device is minimized.

In contrast to the exemplary embodiment illustrated in FIG. 12, additional discontinuities or ferrite rings of the above-described type may be arranged along the conductor structure 12g or the signal transmission/reception section LSW, e.g., in order to thereby realize a desired "wave shaping."

In many applications, it is worthwhile if the signal transmission/reception section of the antenna provided for the transmission/reception (e.g. LSW in FIG. 12) extends along a certain path on or in a technical device (e.g. a cabinet or rack), wherein this path may extend, e.g., linearly, but also along more complex routes.

In summary, the described embodiments make it possible to realize antennas, e.g., with the following advantages:

- Generation of an essentially short-range electromagnetic field around the antenna, but relatively little emission.
- Good control over the field with respect to range, field intensity, reflections, power losses; no "detection gaps" along the antenna.
- Simple adjustability to a desired antenna impedance (e.g. 50Ω) in different surroundings and frequency bands.
- The antenna can be very easily manufactured, e.g., either from flexible or rigid coaxial lines, according to one and the same principle.
- The antenna can operate in a "coupled mode" at all intended operating frequencies. An emission ("radiating mode") proportion can be kept low.
- The antenna may be at least partially manufactured from structures that are simultaneously used otherwise, particularly from solid or hollow metallic structures in order to realize the required sheath conductor or the internal conductor. In the context of the invention, it should be noted that suitable metallic structures may be useful, e.g., on clothes rails, white canes or mechanical braces and profile carriers (e.g. of racks, merchandise presentation stands, etc.), wherein these structures are merely cited as examples.
- The antenna can also be operated with high transmission power and in the vicinity of metallic surfaces such that no significant reflections are caused on these surfaces. The antenna can be operated a few mm from metallic surfaces.
- A robust, insensitive operation can be realized, e.g. such that the impedance also does not change significantly if the antenna is arranged in the vicinity of metal (e.g. sound function in an open metal cabinet, as well as a closed metal cabinet).
- Two-dimensional and three-dimensional antenna structures can be easily realized (e.g. underneath tabletops or countertops, on tunnels or warehouse doors, installed in building floors (e.g. floor pavement, etc.) or in vehicles).
- The antenna can be easily mounted and integrated into objects of the above-described type (particularly cabinets, racks or the like).

The invention claimed is:

1. An antenna for short-range applications, particularly RFID applications, comprising:
   an elongate two-pole conductor structure with an internal conductor and a sheath conductor coaxially surrounding the internal conductor; and
   a terminal structure arranged on a longitudinal end of the conductor structure,
   wherein the terminal structure comprises:
   an electrically insulating carrier plate with an upper side and an underside;
   an electrically conductive sheath conductor connection surface that extends over a first region of the carrier plate on the upper side of the carrier plate and is connected to the sheath conductor;
   an electrically conductive internal conductor connection surface that extends over a second region of the carrier plate which is spaced apart from the first region of the carrier plate, on the upper side of the carrier plate and is connected to the internal conductor;
   an electrically conductive coupling conductor surface that extends over a third region of the carrier plate on the underside of the carrier plate, wherein the third region respectively overlaps at least part of the first region and the second region of the carrier plate and a capacitive coupling is realized between the coupling conductor surface and the sheath conductor connection surface; and
   at least one throughplating that connects the internal conductor connection surface on the upper side of the carrier plate to the coupling conductor surface on the underside of the carrier plate.

2. The antenna according to claim 1, wherein the carrier plate has an elongate shape and wherein the first region is at least partially arranged adjacent to a first longitudinal end of the carrier plate.

3. The antenna according to claim 2, wherein the carrier plate has a rectangular shape.

4. The antenna according to claim 2, wherein the second region is at least partially arranged adjacent to a second longitudinal end of the carrier plate.

5. The antenna according to claim 2, wherein the second region features at least one strip section that extends in a longitudinal direction of the carrier plate in a strip-shaped fashion.

6. The antenna according to claim 5, wherein at least one strip section has an inconsistent width in the longitudinal direction of the carrier plate.

7. The antenna according to claim 2, wherein the third region features at least one strip section that extends in a longitudinal direction of the carrier plate in a strip-shaped fashion.

8. The antenna according to claim 7, wherein at least one strip section has an inconsistent width in the longitudinal direction of the carrier plate.

9. The antenna according to claim 1, wherein the third region overlaps at least a majority of the second region.

10. The antenna according to claim 1, wherein the sheath conductor is connected to the sheath conductor connection surface by means of a contact area that is elongated in the longitudinal direction of the sheath conductor.

11. The antenna according to claim 10, wherein a dimension of the sheath conductor connection surface transverse to the longitudinal direction of the sheath conductor is in the contact area greater than a corresponding dimension of the sheath conductor.

12. The antenna according to claim 1, wherein the internal conductor connection surface comprises a connecting section, which is connected to the internal conductor and multiple strip-shaped branch sections arranged adjacent thereto, wherein the respective ends of said branch sections are connected to the coupling conductor surface by means of at least one respective throughplating.

13. The antenna according to claim 1, wherein the coupling conductor surface comprises a connecting section, which is connected to the at least one throughplating, and multiple strip-shaped branch sections arranged adjacent thereto, wherein said branch sections extend to separate regions of an overlap with the sheath conductor connection surface.

14. A method of using the antenna according to claim 1 as a traveling wave antenna in a coupled mode, wherein the antenna comprises:
   an elongate two-pole conductor structure with an internal conductor and a sheath conductor coaxially surrounding the internal conductor; and
   a terminal structure arranged on a longitudinal end of the conductor structure, wherein the terminal structure comprises:
   an electrically insulating carrier plate with an upper side and an underside;
   an electrically conductive sheath conductor connection surface that extends over a first region of the carrier plate on the upper side of the carrier plate and is connected to the sheath conductor;
   an electrically conductive internal conductor connection surface that extends over a second region of the carrier plate, which is spaced apart from the first region of the carrier plate, on the upper side of the carrier plate and is connected to the internal conductor;
   an electrically conductive coupling conductor surface that extends over a third region of the carrier plate on the underside of the carrier plate, wherein the third region respectively overlaps at least part of the first region and the second region of the carrier plate and a capacitive coupling is realized between the coupling conductor surface and the sheath conductor connection surface; and
   at least one throughplating that connects the internal conductor connection surface on the upper side of the carrier plate to the coupling conductor surface on the underside of the carrier plate.

15. The method according to claim 14, further comprising communicating via said antenna with at least one of a transponder and a component of a computer network, located in a surroundings of the antenna.

16. The method according to claim 14, further comprising transmitting energy between the antenna and at least one device located in the surroundings of the antenna.

* * * * *